(12) United States Patent
Nair et al.

(10) Patent No.: US 7,984,330 B2
(45) Date of Patent: Jul. 19, 2011

(54) SMART RECOVERY OF ASYNCHRONOUS PROCESSING

(75) Inventors: Kishore Nair, Fremont, CA (US);
Yogesh Bhootada, Milpitas, CA (US);
Brian Lam, San Jose, CA (US);
Durgadatt R. Kamath, Cupertino, CA (US); Randy Ho, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 365 days.

(21) Appl. No.: 12/395,338

(22) Filed: Feb. 27, 2009

(65) Prior Publication Data

US 2010/0223620 A1 Sep. 2, 2010

(51) Int. Cl.
*G06F 11/00* (2006.01)

(52) U.S. Cl. .......................................... 714/20; 718/102

(58) Field of Classification Search .................... 714/20, 714/2, 39, 47.1, 49; 718/102
See application file for complete search history.

(56) References Cited

U.S. PATENT DOCUMENTS 7,757,168 B1 * 7/2010 Shanahan et al. ............. 715/255
2010/0235337 A1 * 9/2010 Shanahan et al. ............. 707/705

* cited by examiner

*Primary Examiner* — Dieu-Minh Le
(74) *Attorney, Agent, or Firm* — Fiala & Weaver P.L.L.C.

(57) ABSTRACT

Systems, methods, and computer program products are described that are capable of recovering an asynchronous process after an error occurs with respect to the process. For example, the process may be re-initiated upon detection of the error. The re-initiated process is capable of not repeating tasks of the process that were completed prior to the occurrence of the error.

20 Claims, 10 Drawing Sheets

SMART RECOVERY OF ASYNCHRONOUS PROCESSING

BACKGROUND OF THE INVENTION

1. Field of the Invention

The present invention generally relates to asynchronous processing. In particular, the present invention is related to recovering an asynchronous process.

2. Background

Certain online advertisement ("ad") networks enable online ads to be served to users visiting the Web sites of publishers that are participating in the online ad network. Advertisers generate the online ads and buy placements (a.k.a. inventory) for those ads on the publishers' Web sites usually based on the anticipated audiences for those sites. A placement represents a publisher's agreement to serve a trafficked (i.e., specified) ad to users when the users visit the publisher's site.

The publisher often includes a link to the trafficked ad in one or more Web pages of its Web site. When a user's Web browser loads a Web page that includes the link, the link is executed, which causes an ad call (also referred to as an impression call) to be placed to an ad server that stores the trafficked ad. Upon receiving the ad call, the ad server serves the ad to the user in fulfillment of the purchased placement. The trafficked ad typically is served contemporaneously with other content associated with the publisher's site.

Advertisers may upload creative assets to an asset processing system within an online ad network for inclusion in online ads that are served to users. A creative asset is well known in the relevant art(s) to be a media component of an online ad. For example, the creative asset may be an audio component, an image component, and/or a video component of an online ad. Some types of creative assets are processed before being included in the online ads. Video files, for example, are often encoded into a designated format, so that they can be played on the Web pages on which they are served. An error may occur during processing of the creative assets for any of a variety of reasons. In such instances, it may be desirable to recover the process. The recovery technique should be efficient and avoid consuming substantial bandwidth and/or resources of the online ad network.

Thus, systems, methods, and computer program products are needed that are capable of recovering a process, such as an asynchronously-executed creative asset processing job, in an efficient manner.

BRIEF SUMMARY OF THE INVENTION

Systems, methods, and computer program products are described herein for recovering an asynchronous process in response to an error occurring with respect to the process. The process may be re-initiated upon detection of the error. The re-initiated process is capable of not repeating tasks of the process that were completed prior to the occurrence of the error.

By not repeating completed tasks, an embodiment of the present invention can advantageously increase the efficiency of an asynchronous process. Asynchronous processes that utilize the process recovery techniques described herein may consume less bandwidth and/or fewer resources of a system, as compared to conventional asynchronous processing techniques.

In particular, first and second methods are described. The first method is implemented by an asynchronous process configured to perform a series of tasks. In accordance with the first method, information is logged in response to completing one or more tasks of the series of tasks to indicate that the respective one or more tasks are complete. An error is detected with respect to execution of the asynchronous process. A request is made to a scheduler to re-initiate the asynchronous process. The logging, detecting, and requesting operations are performed by the asynchronous process executing in a processing system. The re-initiated asynchronous process does not perform the one or more completed tasks responsive to reading the logged information.

The second method is for performing a series of tasks of an asynchronous process. In accordance with the second method, a determination is made by the asynchronous process executing in a processing system as to whether one or more tasks of the series of tasks have been completed based on whether a scheduler has logged information indicative of a task completion with respect to the respective tasks. Responsive to determining that a task of the one or more tasks has been completed, the asynchronous process does not perform that task. Responsive to determining that a task of the one or more tasks has not been completed, the asynchronous process performs that task.

A computer program product is also described. The computer program product includes a computer-readable medium having computer program logic recorded thereon for enabling a processor-based system to perform a series of tasks of an asynchronous process. The computer program logic includes a first program logic module, a second program logic module, a third program logic module, and a fourth program logic module. The first program logic module is for enabling the processor-based system to perform a first operation by which the asynchronous process logs information in response to completing one or more tasks of the series of tasks to indicate that the respective one or more tasks are complete. The second program logic module is for enabling the processor-based system to perform a second operation by which the asynchronous process detects an error with respect to execution of the asynchronous process. The third program logic module is for enabling the processor-based system to perform a third operation by which the asynchronous process requests that a scheduler re-initiate the asynchronous process. The fourth program logic module is for enabling the processor-based system to perform a fourth operation by which the re-initiated asynchronous process does not perform the one or more completed tasks responsive to reading the logged information.

A system to perform a series of tasks of an asynchronous process is also described herein. The system includes an information log module, an error detection module, a re-initiation request module, and a completion determination module. The information log module is configured to enable the asynchronous process to log information in response to one or more tasks of the series of tasks being completed. The logged information indicates that the respective one or more tasks are complete. The error detection module is configured to enable the asynchronous process to detect an error with respect to execution of the asynchronous process. The re-initiation request module is configured to request that a scheduler re-initiate the asynchronous process. The completion determination module is configured to enable the re-initiated asynchronous process to not perform the one or more completed tasks responsive to reading the logged information.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE
DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
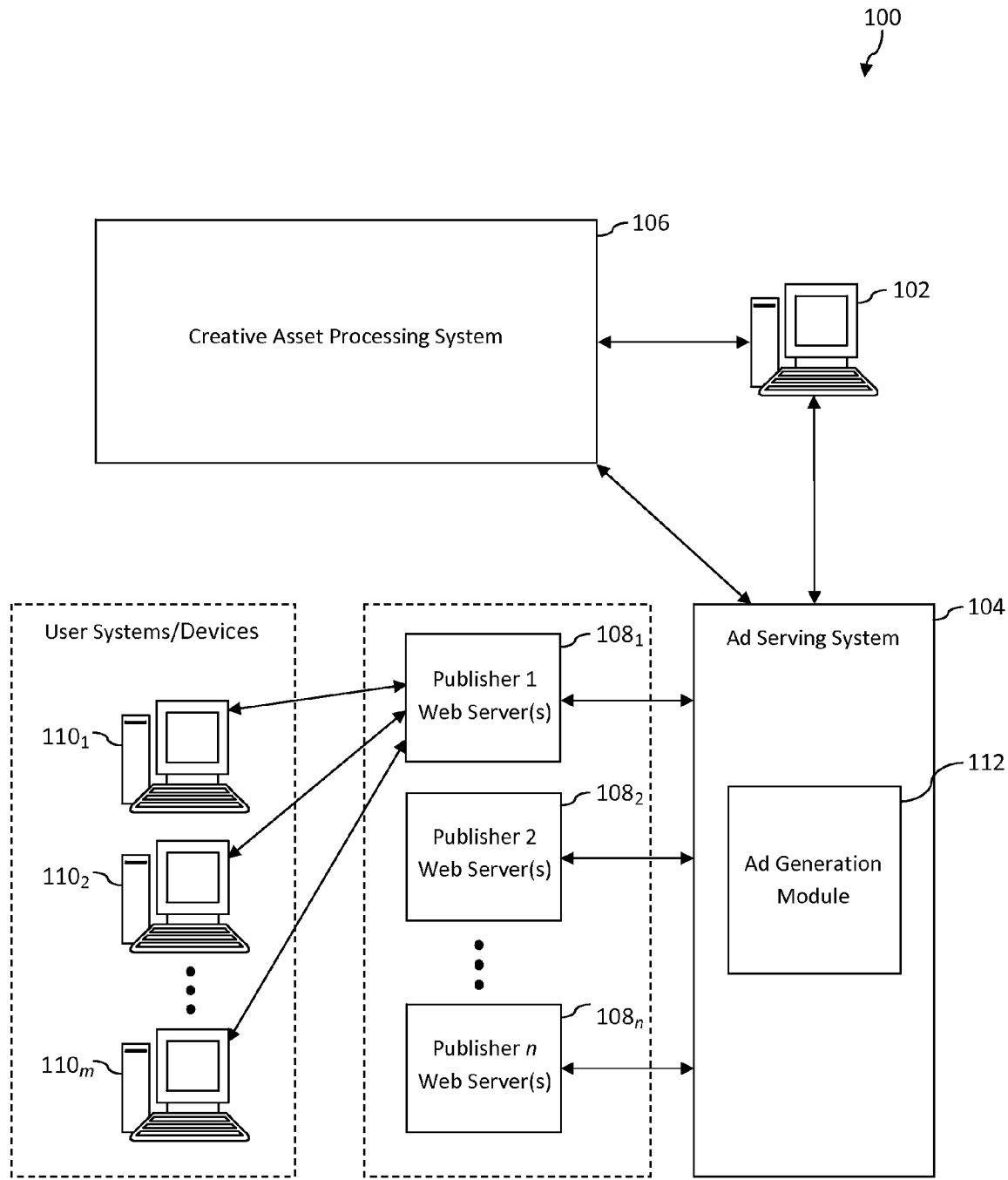
FIG. 1 is a block diagram of an example online advertisement ("ad") network in accordance with an embodiment of the present invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention. For instance, although the embodiments described herein refer specifically, and by way of example, to online advertisement ("ad") networks, it will be readily apparent to persons skilled in the relevant art(s) that embodiments are equally applicable to other types of networks and/or systems.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to implement such feature, structure, or characteristic in connection with other embodiments whether or not explicitly described.

II. Example Online Advertising Network

Embodiments of the present invention are capable of recovering an asynchronous process without having to repeat tasks of the process that have been completed. For instance, a creative asset that is uploaded in an online ad network may be processed in accordance with any number of asynchronous processes before being included in an online ad. Example asynchronous processes include but are not limited to a send queue job, a poll queue job, and a receive queue job, which are described in further detail below in section III with reference to FIGS. 3, 4, and 5, respectively. Each of these processing jobs includes a plurality of tasks. Each task defines either an action or a request and a resulting action, as described in section III with reference to activity diagrams 300, 400, and 500 of respective FIGS. 3, 4, and 5.

When an error occurs during a processing job (or other asynchronous process), embodiments may be capable of re-initiating the processing job without repeating task(s) of the job that have already been completed.

FIG. 1 is a block diagram of an example online ad network in accordance with an embodiment of the present invention. Generally speaking, online ad network 100 operates to serve online ads provided by advertisers to Web sites published by publishers when such Web sites are accessed by certain users of the network, thereby delivering the online ads to the users. As shown in FIG. 1, online ad network 100 includes at least one advertiser system/device 102, an ad serving system 104, a creative asset processing system 106, a plurality of publisher Web servers $108_1$-$108_n$, and a plurality of user systems/devices $110_1$-$110_m$.

Each of publisher Web servers $108_1$-$108_n$ is configured to host a Web site published by corresponding publisher 1-n so that such Web site is accessible to users of network 100. A user may access such Web sites using a Web browser or other Web client installed on a system/device owned by or otherwise accessible to the user. By way of example, FIG. 1 shows a plurality of user systems/devices $110_1$-$110_m$, each of which executes a Web browser that enables a user to visit any of the Web sites hosted by publisher Web servers $108_1$-$108_n$. As depicted in FIG. 1, each of client systems/devices $110_1$-$110_m$ is communicatively connected to publisher 1 Web server(s) $108_1$ for the purpose of accessing a Web site published by publisher 1. Persons skilled in the relevant art(s) will recognize that each of user systems/devices $110_1$-$110_m$ is capable of connecting to any of publisher Web servers $108_1$-$108_n$ to access the Web sites hosted thereon. Communication between user systems/devices $110_1$-$110_m$ and publisher Web servers $108_1$-$108_n$ is carried out over a wide area network, such as the Internet, using well-known network communication protocols.

Ad serving system 104 is configured to deliver online ads to each of publisher Web servers $108_1$-$108_n$ when the Web sites hosted by such Web servers are accessed by certain users, thereby facilitating the delivery of such online ads to the users. For example, ad serving system 104 may receive the online ads from an advertiser system/device 102. In another example, ad generation module 112 of ad serving system 104 may generate the online ads based on one or more creative assets received from the advertiser system/device 102 via creative asset processing system 106.

Creative asset processing system 106 is configured to process creative assets received from the advertiser system/device 102, so that the creative assets may be included in online ads generated by ad generation module 112 of ad serving system 104. Examples of creative assets include but are not limited to video files, audio files, image files, etc. In one example implementation, creative asset processing system 106 encodes video files into a designated format. For instance, ad serving system 104 may be configured to serve the video files in accordance with only the designated format, though the scope of the present invention is not limited in this respect.

In further accordance with this example implementation, creative asset processing system 106 may be configured to generate a plurality of encoded files corresponding to respective bitrates, based on the uploaded video file. For instance, an advertiser or representative thereof may upload the video file having any of a variety of initial formats, such as Windows Media Video (WMV) format developed by Microsoft Corporation, QuickTime® format developed by Apple Inc., Audio Video Interleave (AVI) format developed by Microsoft Corporation, Motion Picture Experts Group (MPEG) format developed by the Motion Picture Experts Group, etc. using advertiser system/device 102. Creative asset processing system 106 is capable of encoding a video file having any of the initial formats to generate the plurality of encoded files having the designated format.

The bitrates associated with the encoded files correspond to respective bandwidths that may be available for delivering online ads. For instance, creative asset processing system 106 may be configured to generate five encoded files based on the video file. Four of the five encoded files may correspond to bitrates of 100 kilobits per second (kbps), 300 kbps, 700 kbps, and 1000 kbps, respectively. These example bitrates are provided for illustrative purposes and are not intended to be limiting. The fifth encoded file may include a thumbnail view of an image associated with the video file. For example, the thumbnail view may be a frame of the video associated with the video file to serve as a preview of the video.

The advertiser who uploaded the video file may access the encoded files associated with the video file using a Web browser or other Web client installed on advertiser system/device 102, for example. The advertiser may select among the encoded files for inclusion in an online ad. The Web browser may list uniform reference locators (URLs) or other identifiers associated with the respective encoded files, which the advertiser may copy and paste into the online ad, for example.

Creative asset processing system 106 may utilize any of a variety of encoding platforms and/or techniques to encode the video file. For instance, creative asset processing system 106 may use open source software, such as FFmpeg (developed by Fabrice Bellard and maintained by Michael Niedermayer) or MPlayer (developed by Arpad Gereoffy and maintained by Alex Beregszaszi); On2 Flix Engine developed by On2 Technologies Inc.; Carbon Coder/Carbon Server developed by Rhozet, which is a business unit of Harmonic, Inc.; a proprietary encoding technique, etc.

Creative asset processing system 106 may execute any number of asynchronous processes in preparation of a creative asset for inclusion in online ads. For instance, in the example implementation mentioned above, a first asynchronous process may perform tasks necessary for providing the video file to an encoder. A second asynchronous process may monitor the status of the encoding process. A third asynchronous process may provide encoded file(s) generated by the encoder to ad generation module 112, so that the encoded file(s) may be used in online ads. Creative asset processing system 106 is capable of re-initiating any one or more of the asynchronous processes upon detection of an error with respect to the asynchronous process.

Upon re-initiation of the asynchronous process, the asynchronous process determines whether to perform a task based on whether the task has already been completed. For instance, some of the tasks may have been completed prior to the occurrence of the error. Creative asset processing system 106 is capable of not performing those tasks to avoid duplication of effort.

The functionality of creative asset processing system 106 is described herein with continued reference to the example implementation mentioned above, in which video files are encoded into a designated format. It will be recognized, however, that the embodiments described herein are applicable to implementations that are configured to perform any of a variety of processes with respect to any suitable type of creative asset.

Communication among advertiser system/device 102, ad serving system 104, and creative asset processing system 106 is carried out over a wide area network, such as the Internet, using well-known network communication protocols. Although one advertiser system/device 102 is depicted in FIG. 1, persons skilled in the relevant art(s) will recognize that any number of advertiser system/devices may be communicatively coupled to ad serving system 104 and/or creative asset processing system 106. For instance, the functionality of creative asset processing system 106 may be accessible to one or more advertisers or representatives thereof via respective advertiser system/devices.

Although advertiser system/device 102 and user systems/devices 110$_1$-110$_m$ are depicted as desktop computers in FIG. 1, persons skilled in the relevant art(s) will appreciate that advertiser system/device 102 and user systems/devices 110$_1$-110$_m$ may include any browser-enabled system or device, including but not limited to a laptop computer, a personal digital assistant, a cellular telephone, or the like.

III. Example Creative Asset Processing System

Figure 2:
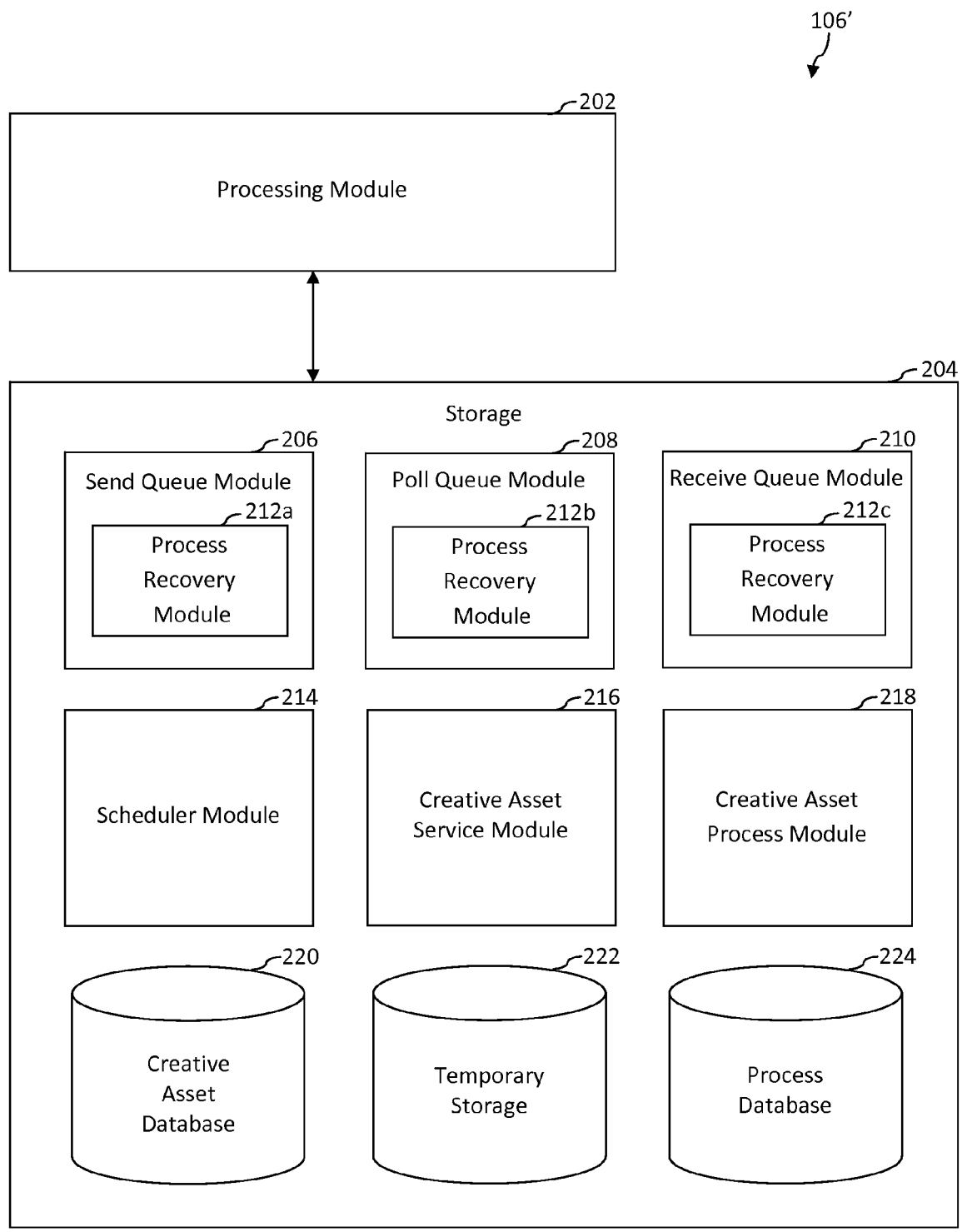
FIG. 2 is a block diagram of an example implementation of the creative asset processing system shown in FIG. 1 in accordance with an embodiment of the present invention.

FIG. 2 is a block diagram of an example implementation 106' of creative asset processing system 106 shown in FIG. 1 in accordance with an embodiment of the present invention. As shown in FIG. 2, creative asset processing system 106' includes a processing module 202 that includes one or more processors (e.g., one or more central processing units (CPUs)) and a storage 204 that are communicatively connected for performing asynchronous processes with respect to creative assets provided by one or more advertisers or representatives thereof via respective advertiser systems/devices, as shown of FIG. 1. Storage 204 includes a send queue module 206, a poll queue module 208, a receive queue module 210, a scheduler module 214, a creative asset service module 216, a creative asset process module 218, a creative asset database 220, a temporary storage 222, and a process database 224.

Send queue module 206 includes instructions to enable processing module 202 to perform one or more send queue jobs. For instance, processing module 202 may perform operations such as storing an uploaded creative asset (e.g., a video file), requesting that a process (e.g., an encoding process) be performed with respect to the uploaded video file, and creating a poll queue job to be performed by poll queue module 208 in accordance with instructions stored in send queue module 206. An example send queue job is described in greater detail below in section III of this document with reference to activity diagram 300 of FIG. 3.

Poll queue module 208 includes instructions to enable processing module 202 to perform one or more poll queue jobs. For example, processing module 202 may perform operations such as polling the encoding process at a poll time to determine whether the encoding process has been completed in accordance with instructions stored in poll queue module 208. The encoding process may generate a plurality of encoded files based on the uploaded video file, with each encoded file being associated with a respective bitrate. For instance, a first encoded file may be configured to run at a first bit rate. A second encoded file may be configured to run at a second bitrate, and so on. An example poll queue job is described in greater detail below in section III of this document with reference to activity diagram 400 of FIG. 4.

Receive queue module 210 includes instructions to enable processing module 202 to perform one or more receive queue jobs. For example, processing module 202 may perform operations such as storing encoded files in creative asset database 220, which is accessible to ad serving system 104, in accordance with instructions stored in receive queue module 210, so that ad generation module 112 may incorporate the encoded files into online ads. In further accordance with this example, the receive queue job may be performed in response to an encoding process being completed. An example receive queue job is described in greater detail below in section III of this document with reference to activity diagram 500 of FIG. 5.

Send queue module 206, poll queue module 208, and receive queue module 210 include respective process recovery modules 212a-212c. Process recovery module 212a includes instructions to enable a send queue job to recover itself when an error is detected with respect to the send queue job. Process recovery module 212b includes instructions to enable a poll queue job to recover itself when an error is detected with respect to the poll queue job. Process recovery module 212c includes instructions to enable a receive queue job to recover itself when an error is detected with respect to the receive queue job.

Process recovery modules 212a-212c may include instructions to enable respective send queue jobs, poll queue jobs, and receive queue jobs to perform fewer than all of their tasks when the jobs are re-initiated. For instance, process recovery modules 212a-212c may be capable of enabling a re-initiated send queue job, poll queue job, or receive queue job, respectively, to not repeat tasks of the job that were completed prior to the occurrence of the error.

Scheduler module 214 includes instructions to enable processing module 202 to launch and/or terminate send queue jobs executed in accordance with instructions stored in send queue module 206, poll queue jobs executed in accordance with instructions stored in poll queue module 208, and receive queue jobs executed in accordance with instructions stored in receive queue module 210. For instance, processing module 202 reviews the send queue, the poll queue, and the receive queue associated with respective modules 206, 208, and 210 in accordance with instructions stored in scheduler module 214 to determine jobs in the queues that have a start time within a designated time frame (e.g., within 60 seconds in the future, within 120 seconds in the future, etc.). Processing module 202 launches jobs within the designated time frame, beginning with the job having the nearest start time and/or the highest priority, in further accordance with the instructions stored in scheduler module 214.

Creative asset service module 216 includes instructions to enable processing module 202 to update metadata associated with creative assets and encoded files generated therefrom. For instance, if a creative asset is stored in creative asset database 220, processing module 202 may update metadata associated with the creative asset to include an indicator (e.g., a uniform resource locator (URL)) specifying a location in creative asset database 220 at which the creative asset is stored in accordance with instructions stored in creative asset service module 216.

Creative asset process module 218 includes instructions to enable processing module 202 to perform a process in accordance with a request received from a send queue job. Creative asset process module 218 further includes instructions to enable processing module 202 to respond to inquiries from poll queue module 208 regarding the status of the process. For instance, processing module 202 may perform an encoding process on a video file that is stored in creative asset database 220 in response to a request from send queue module 206 in accordance with instructions stored in creative asset process module 218. Processing module 202 may further provide the status of the encoding process when polled by a poll queue job in accordance with instructions stored in creative asset process module 218.

The instructions of each module 206, 208, 210, 214, 216, and 218 need not necessarily be limited to that particular module. For instance, modules 206, 208, 210, 214, 216, and 218 may share instructions.

Creative asset database 220 is configured to store uploaded creative assets and encoded files generated therefrom. Temporary storage 222 is configured to store encoded files that are generated by processing module 202 in accordance with instructions stored in creative asset process module 218 until processing module 202 successfully stores the encoded files in creative asset database 220 in accordance with instructions stored in receive queue module 210. Process database 224 is configured to store the encoded files when generated by processing module 202 in accordance with instructions stored in creative asset process module 218 at least until processing module 202 stores the encoded files in temporary storage 222 in accordance with instructions stored in receive queue module 210. In an aspect, process database 224 may be located locally with respect to creative asset processing module 218, and temporary storage 222 may be located remotely from creative asset processing module 2186.

Although only a single creative asset database 220, temporary storage 222, and process database 224 are shown in FIG. 2, persons skilled in the relevant art(s) will appreciate that creative assets and encoded files generated therefrom may be stored in multiple creative asset databases, temporary storage systems, and/or encoder databases.

In FIG. 2, the elements of storage 204 (i.e., modules 206, 208, 210, 214, 216, 218, creative asset database 220, temporary database 222, and process database 224) are shown to be included in a single storage 204 for illustrative purposes. However, it will be apparent to persons skilled in the relevant art(s) that storage 204 may include a plurality of storage systems, each storing one or more of the elements (or a portion thereof). Any one or more processors of processing module 202 may be communicatively connected to the respective elements (or portions thereof).

The elements of creative asset processing system 106' may be distributed among a plurality of servers, though the scope of the embodiments is not limited in this respect. For instance, send queue module 206, poll queue module 208, receive queue module 210, scheduler module 214, creative asset service module 216, creative asset process module 218, creative asset database 220, temporary storage 222, and process database 224, along with respective processors of processing module 202, may be included in respective servers of online ad network 100. It will be recognized, however, that a server in online ad network 100 may include two or more elements of creative asset processing system 106'. For example, a first server in online ad network 100 may include creative asset process module 218, process database 224, and at least one processor of processing module 202. In another example, a second server in online ad network 100 may include scheduler module 214, send queue module 206, and at least one processor of processing module 202. In yet another example, a third server in online ad network 100 may include receive queue module 210, process recovery module 212, and at least one processor of processing module 202.

Each of modules 206, 208, 210, 214, 216, and 218 may be implemented in hardware, software, firmware, or any combination thereof. For example, any one or more of modules 206, 208, 210, 214, 216, and 218 may be implemented as computer code configured to be executed by one or more processors. In another example, any one or more of modules 206, 208, 210, 214, 216, and 218 may be implemented as hardware logic/electrical circuitry. In yet another example, any one or more of modules 206, 208, 210, 214, 216, and 218 may be implemented as firmware embedded in one or more hardware devices. In still another example, any one or more of modules 206, 208, 210, 214, 216, and 218 may be implemented as a combination of computer code, hardware logic/electrical circuitry, and/or firmware.

It should be noted that creative asset processing system 106' is provided for illustrative purposes and is not intended to be limiting. Persons skilled in the relevant art(s) will recognize that other creative asset processing system implementations fall within the spirit and scope of the present invention.

Figure 3:
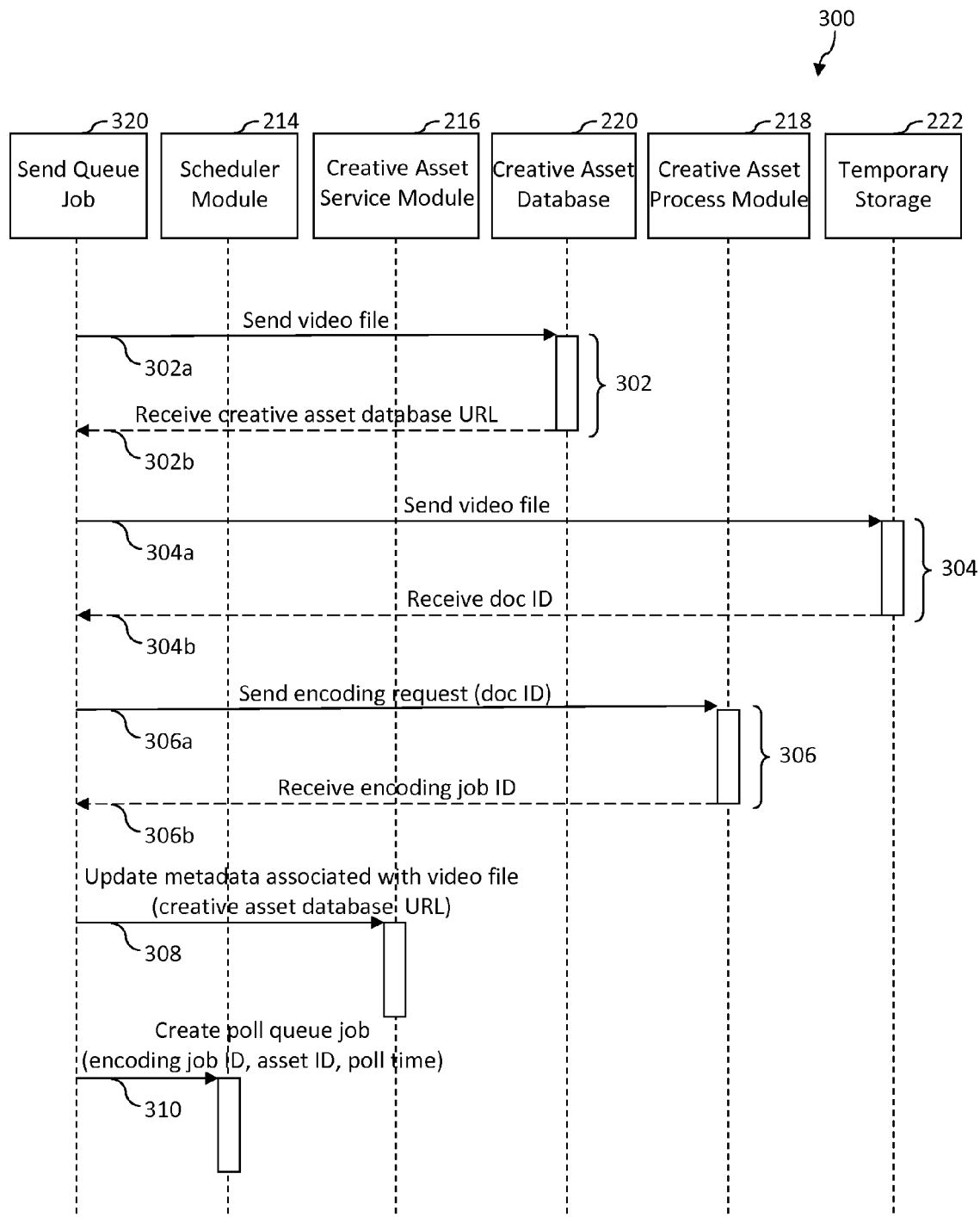
FIG. 3 depicts an activity diagram of an example send queue job in accordance with an embodiment of the present invention.
Figure 4:
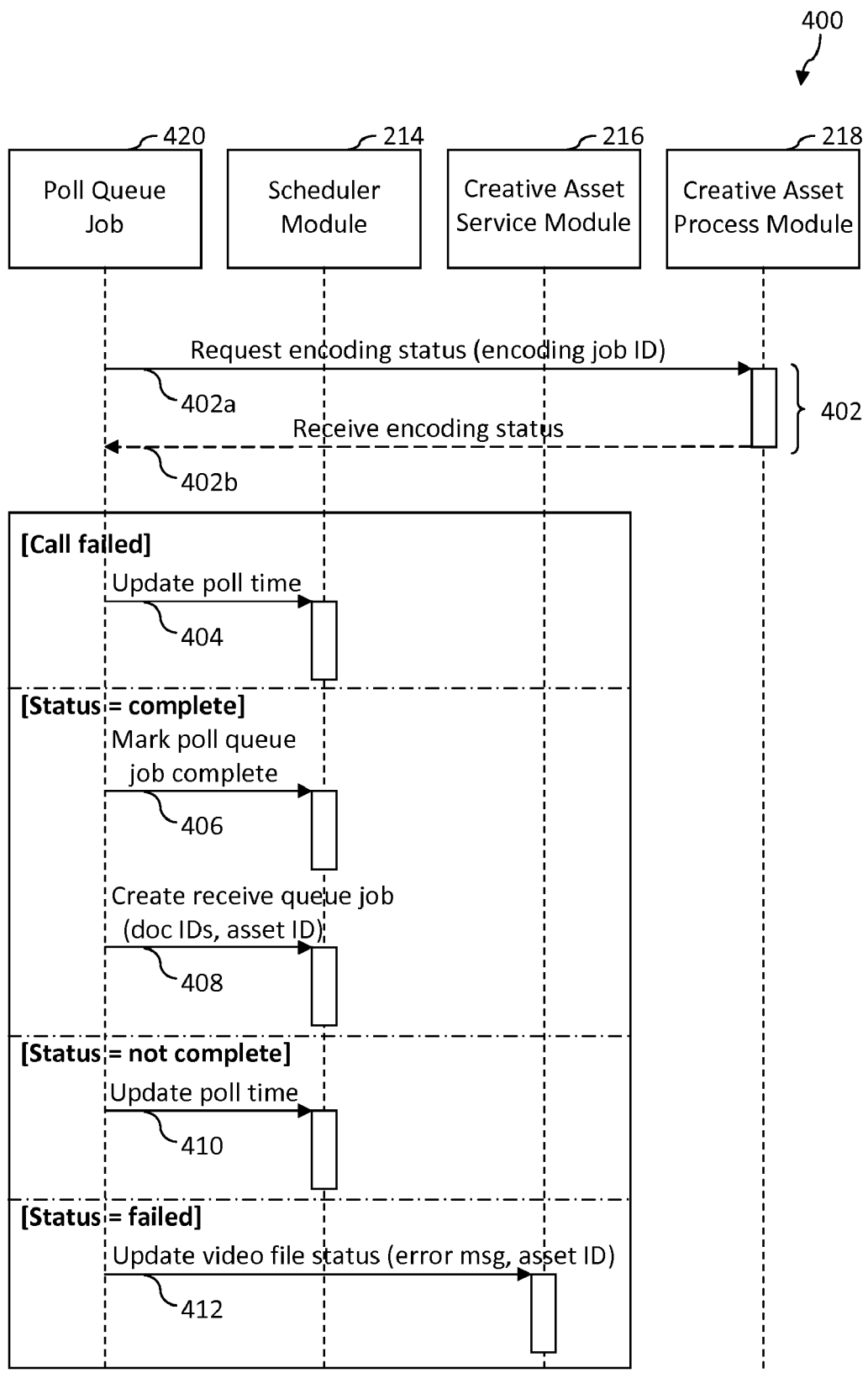
FIG. 4 depicts an activity diagram of an example poll queue job in accordance with an embodiment of the present invention.
Figure 5:
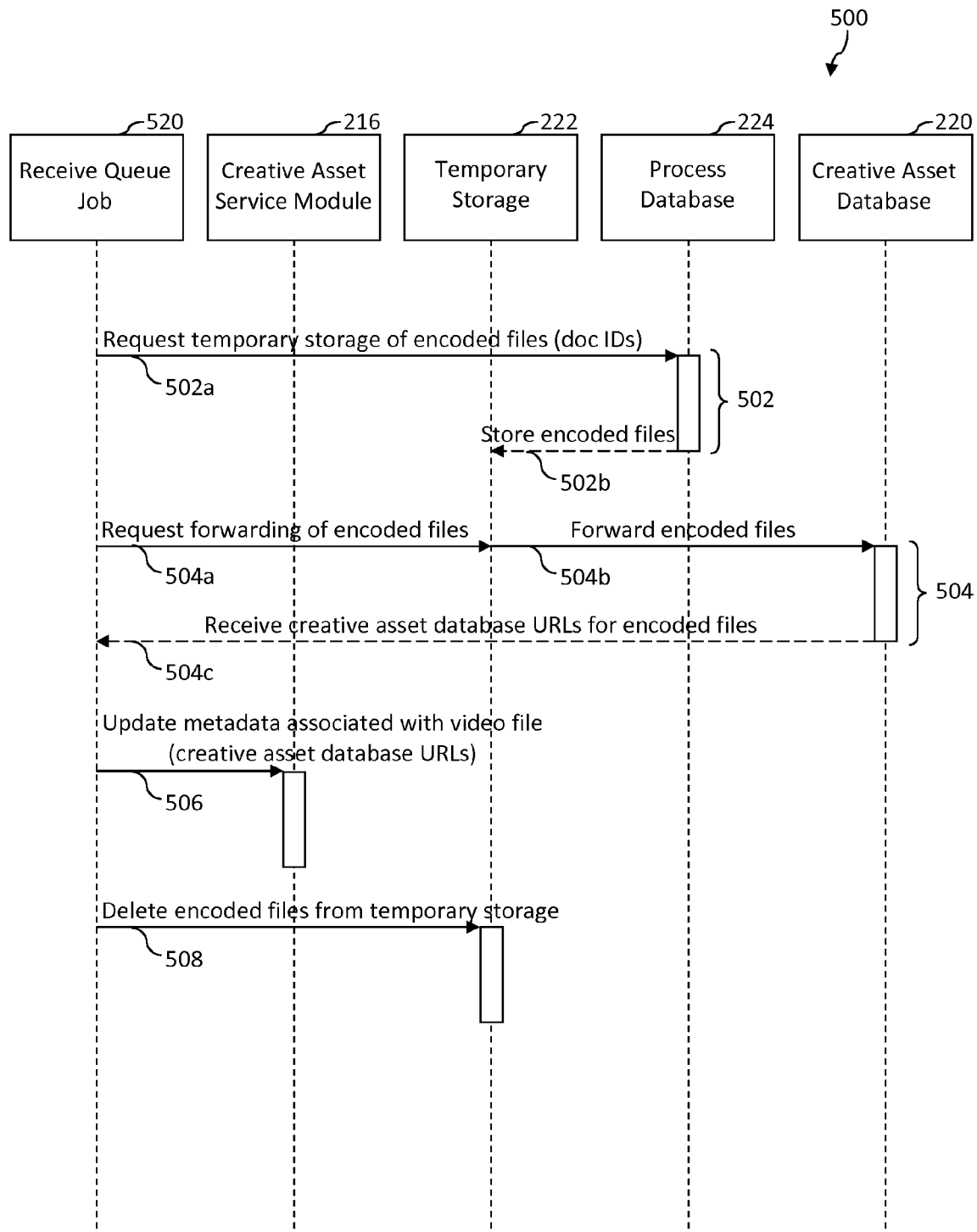
FIG. 5 depicts an activity diagram of an example receive queue job in accordance with an embodiment of the present invention.

FIGS. 3, 4, and 5 depict respective activity diagrams 300, 400, and 500 of an example send queue job 320, an example poll queue job 420, and an example receive queue job 520, respectively, in accordance with embodiments of the present invention. Processing module 202 performs send queue job 320, poll queue job 420, and receive queue job 520 in accordance with instructions stored in send queue module 206, poll queue module 208, and receive queue module 210, respectively.

Send queue job 320, poll queue job 420, and receive queue job 520 each include a plurality of tasks, which are defined as either an action or one or more actions and a response thereto. For example, the send queue job 320 of activity diagram 300 begins with task 302, which includes an action 302a and a response 302b thereto. For ease of discussion, actions and responses are referred to herein as steps. Thus, it can be said that task 302 includes steps 302a and 302b. Similarly, task 304 includes steps 304a and 304b, and task 306 includes steps 306a and 306b. Tasks 308 and 310 each include an action but no response thereto. Thus, tasks 308 and 310 are referred to as steps 308 and 310, respectively.

Referring now to FIG. 3, example send queue job 320 of activity diagram 300 begins at step 302a in which send queue job 320 sends a video (or other creative asset) to creative asset database 220. At step 302b, send queue job 320 receives a creative asset database uniform resource locator (URL) or other indicator indicating the location of the video file in creative asset database 220.

At step 304a, send queue job 320 sends the video (or other creative asset) to temporary storage 222. At step 304b, send queue job 320 receives a document identifier (doc ID) corresponding to the video file from temporary storage 222.

Send queue job 320 sends an encoding request (or other processing request) to creative asset process module 218 at step 306a. The encoding request includes the doc ID corresponding to the video file, which creative asset process module 218 may use to locate the video file. Creative asset processing module 218 enables processing module 202 to initiate an encoding process or "job" with respect to the video file stored in creative asset database 220 responsive to receiving the encoding request. At step 306b, send queue job 320 receives an encoding job identifier (ID) from creative asset process module 218. For instance, creative asset process module 218 may enable processing module 202 to assign the encoding job ID to the encoding process that is performed with respect to the video file stored in creative asset database 220.

At step 308, send queue job 320 sends a request to creative asset service module 216 to update metadata associated with the video file using the creative asset database URL. The request includes the creative asset database URL associated with the video file. Processing module 202 updates the metadata associated with the video file to include the creative asset database URL in response to the request from send queue job 320 in accordance with instructions stored in creative asset service module 216.

At step 310, send queue job 320 sends a request to scheduler module 214 to create a poll queue job. The request includes the encoding job ID received from creative asset process module 218, an asset ID, and a poll time. The asset ID is a unique identifier assigned to the video file by creative asset service module 216. For instance, creative asset service module 216 may generate the asset ID based on the creative asset type, though the scope of the embodiments are not limited in this respect. The poll time is the time at which a status of the encoding process (or other process) being performed by creative asset process module 218 is to be checked. In further accordance with step 310, scheduler module 214 enables processing module 202 to create (i.e., launch) the poll queue job using the encoding job ID, the asset ID, and the poll time in response to receiving the request from send queue job 320.

Tasks 302, 304, 306, 308, and 310 of send queue job 320 depicted in activity diagram 300 are provided for illustrative purposes and are not intended to be limiting. For instance, send queue job 320 need not necessarily include all of tasks 302, 304, 306, 308, and 310. Moreover, it will be recognized that send queue job 320 may include other task(s) in addition to or in lieu of tasks 302, 304, 306, 308, and/or 310.

Referring to FIG. 4, example poll queue job 420 of activity diagram 400 includes tasks 402, 404, 406, 408, 410, and 412. Task 402 includes an action 402a and a response 402b thereto. Thus, it can be said that task 402 includes steps 402a and 402b. Tasks 404, 406, 408, 410, and 412, on the other hand, each include an action but no response thereto. Thus, tasks 404, 406, 408, 410, and 412 are referred to as steps 404, 406, 408, 410, and 412, respectively. As shown in FIG. 4, the poll queue job 420 of activity diagram 400 begins at step 402a in which poll queue job 420 requests the status of the encoding process (or other process), which is being performed by processing module 202 in accordance with instructions stored in creative asset process module 218, at the poll time. The request includes the encoding job ID assigned to the encoding process during send queue job 320 by processing module 202 in accordance with instructions stored in creative asset process module 218. The encoding job ID enables processing module 202 to determine to which encoding process the request pertains in accordance with instructions stored in creative asset process module 218. At step 402b, poll queue job 420 receives the status of the encoding process from creative asset process module 218.

Poll queue job 420 determines which of a variety of operations to perform based on the status of the encoding process. For example, if creative asset process module 218 does not respond to the request for status provided by poll queue job 420 at step 402a (i.e., the call failed), poll queue job 420 updates the poll time at step 404. The updated poll time may be a fixed time after the initial poll time, though the scope of the embodiments is not limited in this respect.

If the status of the encoding process is "complete," poll queue job 420 marks the poll queue job as being complete at step 406. Scheduler module 214 may terminate the poll queue job in response to poll queue job 420 marking the poll queue job as complete. At step 408, poll queue job 420 sends a request to schedule module 202 to create a receive queue job. The request includes the asset ID associated with the video file (or other creative asset) and document identifiers (doc IDs) corresponding to respective encoded files associated with video file. The doc IDs are received by poll queue job 420 from creative asset process module 218 at step 402b in response to the encoding process being "complete." For instance, the doc IDs may not be received at step 402b if the status of the encoding process is anything other than "complete." Scheduler module 214 enables processing module 202 to create (i.e., launch) the receive queue job using the asset ID and the doc IDs corresponding to the respective encoded files in response to receiving the request from poll queue job 420.

If the status of the encoding process is "not complete," indicating that processing module 202 is still performing (or has not yet begun) the encoding process with respect to the video file in accordance with instructions stored in creative asset process module 218, poll queue job 420 updates the poll time at step 410. Poll queue module 208 may include instructions to enable processing module 202 to limit the duration of poll queue job 420. For example, poll queue module 208 may enable processing module 202 to determine that the status of the encoding process is "failed" when the number of times creative asset process module 218 provides a status of "not complete" or "call failed" exceeds a threshold. In another example, poll queue module 208 may enable processing module 202 to determine that the status of the encoding process is "failed" when poll queue job 420 takes longer than a designated period of time.

If the status of the encoding process is "failed," indicating that poll queue job 420 will no longer poll creative asset process module 218 for the status of the encoding process, poll queue job 420 sends a request to creative asset service module 216 to update the status of the video file at step 412. The request includes an error message and the asset ID of the video file. Creative asset service module 216 enables processing module 202 to update the status of the video file using the error message and the asset ID in response to receiving the request from poll queue job 420. For instance, creative asset service module 216 may enable processing module 202 to update metadata associated with the video file to include the error message. The updated status of the video file indicates to the advertiser or representative thereof who uploaded the video file that the encoding process was not successfully performed. It should be noted that tasks 402, 404, 406, 408, 410, and 412 of poll queue job 420 depicted in activity diagram 400 are provided for illustrative purposes and are not intended to be limiting.

Referring to FIG. 5, example receive queue job 520 of activity diagram 500 includes tasks 502, 504, 506, and 508. Task 502 includes an action 502a and a response 502b thereto. Thus, it can be said that task 502 includes steps 502a and 502b. Task 504 includes two actions 504a and 504b and a response 504c thereto. Thus, it can be said that task 504 includes steps 504a, 504b, and 504c. Tasks 506 and 508 each include an action but no response thereto. Thus, tasks 506 and 508 are referred to as steps 506 and 508, respectively. As shown in FIG. 5, receive queue job 520 of activity diagram 500 begins at step 502a in which receive queue job 520 sends a request to process database 224 to store encoded files in temporary storage 222. The request includes the doc IDs received from creative asset process module 218 during poll queue job 420. The doc IDs enable processing module 202 to determine to which encoded files the request pertains. At step 502b, processing module 202 stores the encoded files in temporary storage 222 in response to the request from receive queue job 520.

At step 504a, receive queue job 520 sends a request to temporary storage 222 to forward the encoded files to creative asset database 220. At step 504b, processing module 202 forwards the encoded files to creative asset database 220 in response to the request from receive queue job 520. Receive queue job 520 receives creative asset database URLs or other indicators indicating the respective locations of the encoded files in creative asset database 220 at step 504c.

At step 506, receive queue job 520 sends a request to creative asset service module 216 to update metadata associated with the video file stored in creative asset database 220 to include the creative asset database URLs of the respective encoded files that are also stored in creative asset database 220. The request includes the creative asset database URLs associated with the respective encoded files. Creative asset service module 216 enables processing module 202 to update the metadata associated with the video file to include the creative asset database URLs in response to receiving the request from receive queue job 520.

At step 508, receive queue job 520 deletes the encoded files from temporary storage 222. For instance, receive queue job 520 may perform step 508 in response to receiving an indicator indicating that the encoded files have been successfully stored in creative asset database 220. In an aspect, receiving the creative asset database URLs at step 504c may serve as an indication to receive queue job 520 that the respective encoded files are successfully stored in creative asset database 220.

Any one or more of steps 502a, 502b, 504a, 504b, 504c, 506, or 508 may be performed with respect to any one or more of the encoded files at once. For example, the steps 502a, 502b, 504a, 504b, 504c, 506, and 508 of activity diagram 500 may be performed for each encoded file independently, rather than for all encoded files at once. The steps 502a, 502b, 504a, 504b, 504c, 506, and 508 may be performed a first time with respect to a first encoded file, a second time with respect to a second encoded file, and so on.

Creative asset database 220 may continue to store the video file even after the encoded files are stored in creative asset database 220 in case a need arises to re-generate the encoded files. For instance, one or more of the encoded files may become corrupted or deleted, in which case send queue job 320 may send another request to creative asset process module 218 to perform the encoding process again, as described above with reference to step 306a of activity diagram 300.

Tasks 502, 504, 506, and 508 of receive queue job 520 depicted in activity diagram 500 are provided for illustrative purposes and are not intended to be limiting. For instance, receive queue job 520 need not necessarily include all of tasks 502, 504, 506, and 508. Moreover, it will be recognized that receive queue job 520 may include other task(s) in addition to or in lieu of tasks 502, 504, 506, and/or 508.

IV. Further Discussion of Example Process Recovery Techniques

Figure 6:
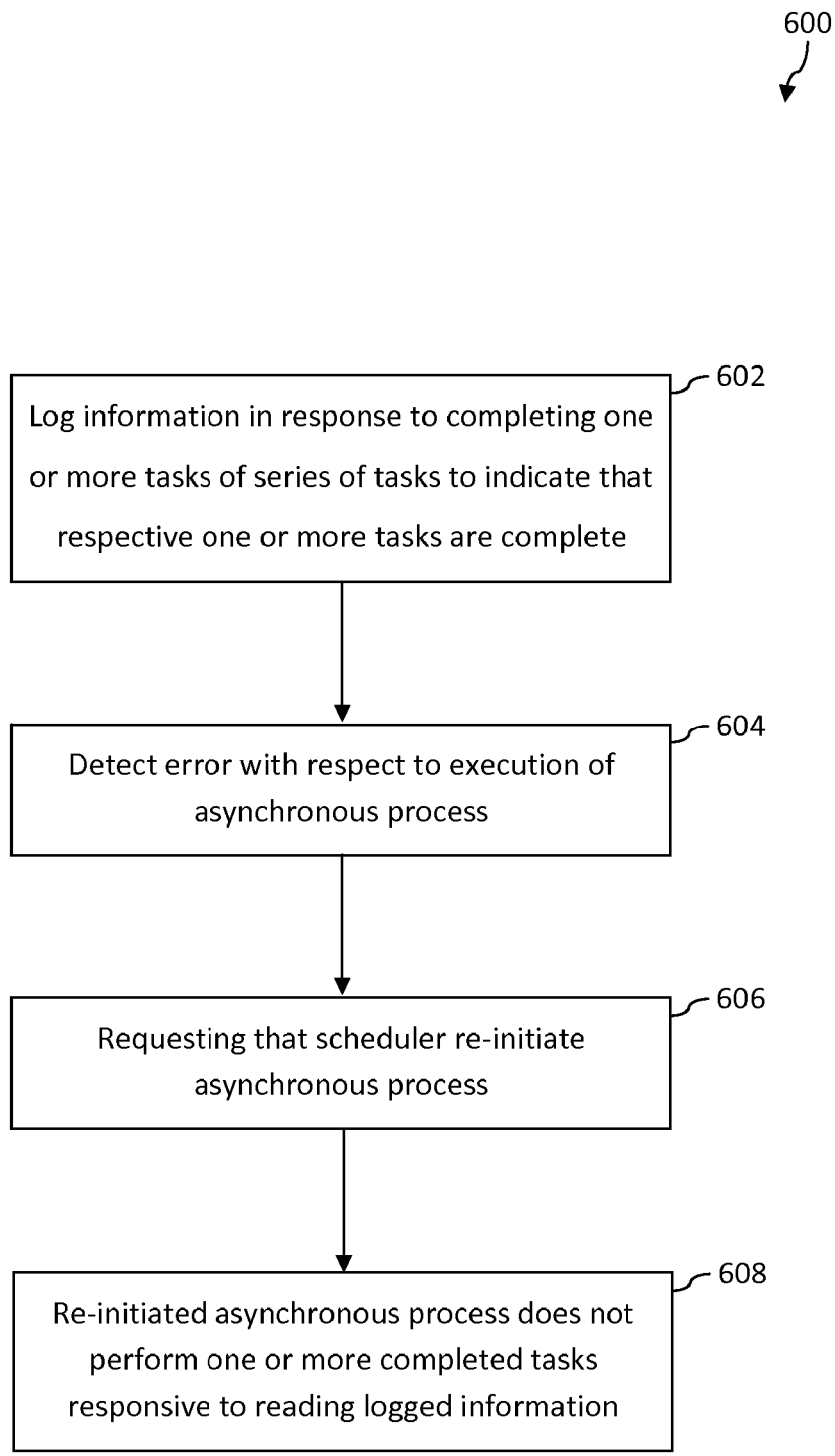
FIGS. 6 and 8 depict flowcharts of methods for recovering an asynchronous process in accordance with embodiments of the present invention.
Figure 7:
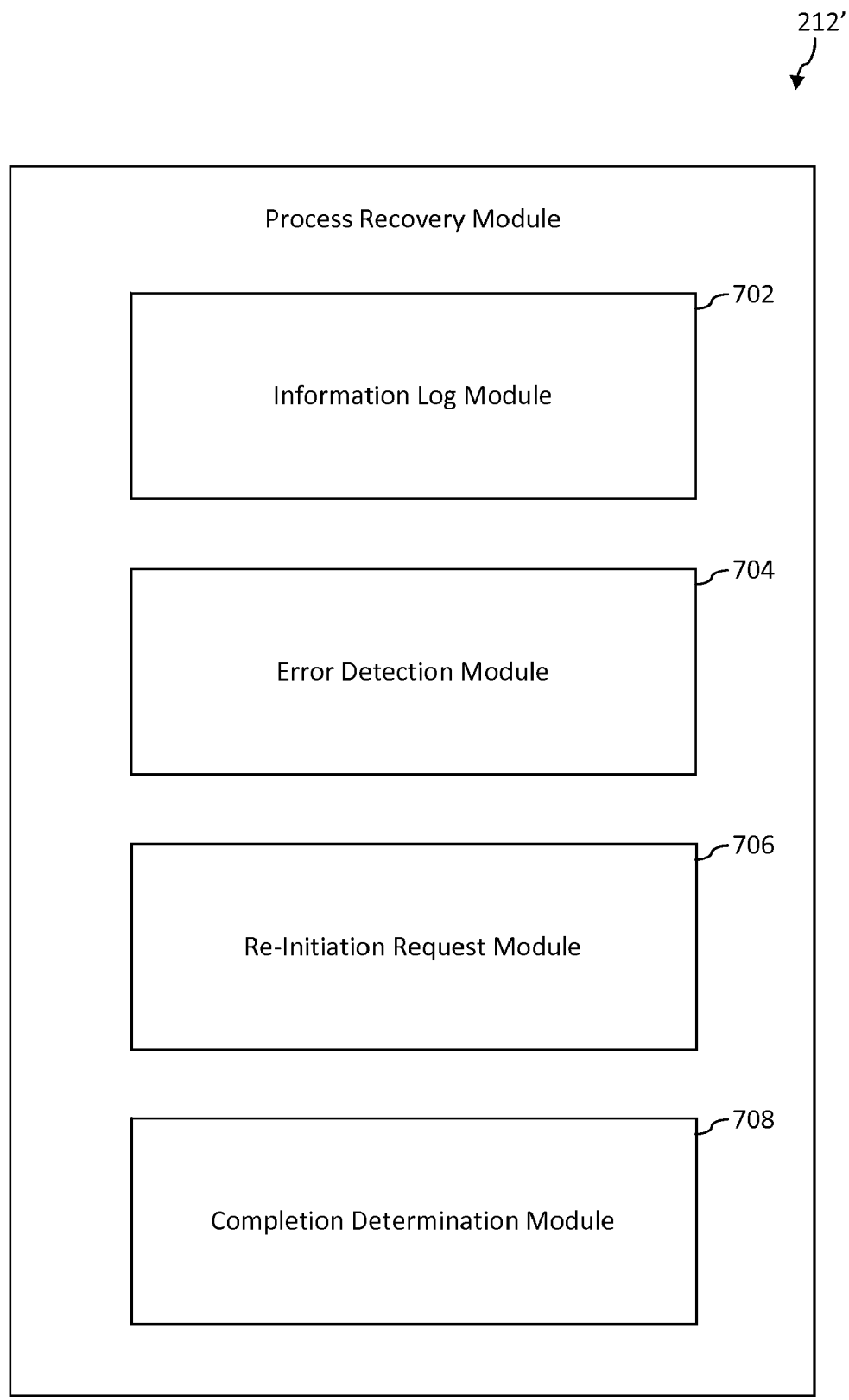
FIGS. 7 and 9 are block diagrams of example implementations of the process recovery modules shown in FIGS. 1 and 2 in accordance with embodiments of the present invention.

FIG. 6 depicts a flowchart 600 of a method for recovering an asynchronous process in accordance with an embodiment of the present invention. Flowchart 600 may be performed by a process recovery module 212 of creative asset processing system 106' shown in FIG. 2, for example. For illustrative purposes, flowchart 600 is described with respect to a process recovery module 212' shown in FIG. 7, which is an example implementation of a process recovery module 212, according to an embodiment of the present invention. As shown in FIG. 7, process recovery module 212' includes an information log module 702, an error detection module 704, a re-initiation request module 706, and a completion determination module 708. Further structural and operational embodiments will be apparent to persons skilled in the relevant art(s) based on the discussion regarding flowchart 600. Flowchart 600 is described as follows.

As shown in FIG. 6, the method of flowchart 600 begins at step 602 in which processing module 202 logs information in accordance with instructions stored in information log module 702 in response to completing one or more tasks of a series of tasks to indicate that the respective one or more tasks are complete. Processing module 202 executes an asynchronous process that is configured to perform the series of tasks. The asynchronous process may be a send queue job performed by send queue module 206, a poll queue job performed by poll queue module 208, or a receive queue job performed by receive queue module 210, though the scope of the present invention is not limited in this respect. For instance, the asynchronous process may be performed with respect to a creative asset, such as a video file, or one or more processed (e.g., encoded) files that are based on the creative asset.

In an example implementation, processing system 202 may store variables or fields corresponding to respective tasks of the series of tasks in scheduler module 214 (or another element of creative asset processing system 106) in accordance with instructions stored in scheduler module 214 (or another element). When a task is completed, processing module 202 may update the corresponding variable in accordance with instructions stored in scheduler module 214 (or another element) to indicate that the task has been completed. As an example, in task 302 of send queue job 320, send queue job 320 receives a creative asset database URL from creative asset database 220. Scheduler module 214 (or another element) may enable processing module 202 to update the variable corresponding to task 302 to indicate that the creative asset database URL has been received. For instance, processing module 202 may update the variable to include the creative asset database URL.

At step 604, processing module 202 detects an error with respect to execution of the asynchronous process in accordance with instructions stored in error detection module 704. In an aspect, error detection module 704 may enable processing module 202 to detect a timeout indicator with respect to the asynchronous process. For instance, the timeout indicator may indicate that the duration of the asynchronous process has reached a maximum time allotted for performing the asynchronous process. In another aspect, error detection module 704 may enable processing module 202 to detect an error indicator received from a database (e.g., creative asset database 220) for storing a creative asset (e.g., a video file) that is a subject of the asynchronous process. For instance, the database may generate the error indicator in response to failing to properly store or retrieve the creative asset.

At step 606, processing module 202 requests that a scheduler (e.g., scheduler module 214) re-initiate the asynchronous process in accordance with instructions stored in re-initiation request module 706. Upon receiving the request for re-initiation, the scheduler enables processing module 202 to assign the next run timestamp to the asynchronous process. For instance, each of send queue job 320, poll queue job 420, and receive queue job 520 may store a timestamp indicating when the respective job is to run next. The scheduler enables processing module 202 to update the timestamp associated with a job to be the next available timestamp in response to receiving a request for re-initiation of the job. For example, the updated timestamp may indicate that the job is to be run within a designated time frame (e.g., within 60 seconds in the future, within 120 seconds in the future, etc.).

At step 608, the re-initiated asynchronous process does not perform the one or more completed tasks responsive to reading the logged information. For example, processing module 202 may read the logged information in accordance with instructions stored in completion determination module 708 to determine the one or more completed tasks. Processing module 202 may enable the re-initiated asynchronous process to not perform the one or more completed tasks based on the logged information in accordance with instructions stored in completion determination module 708.

Figure 8:
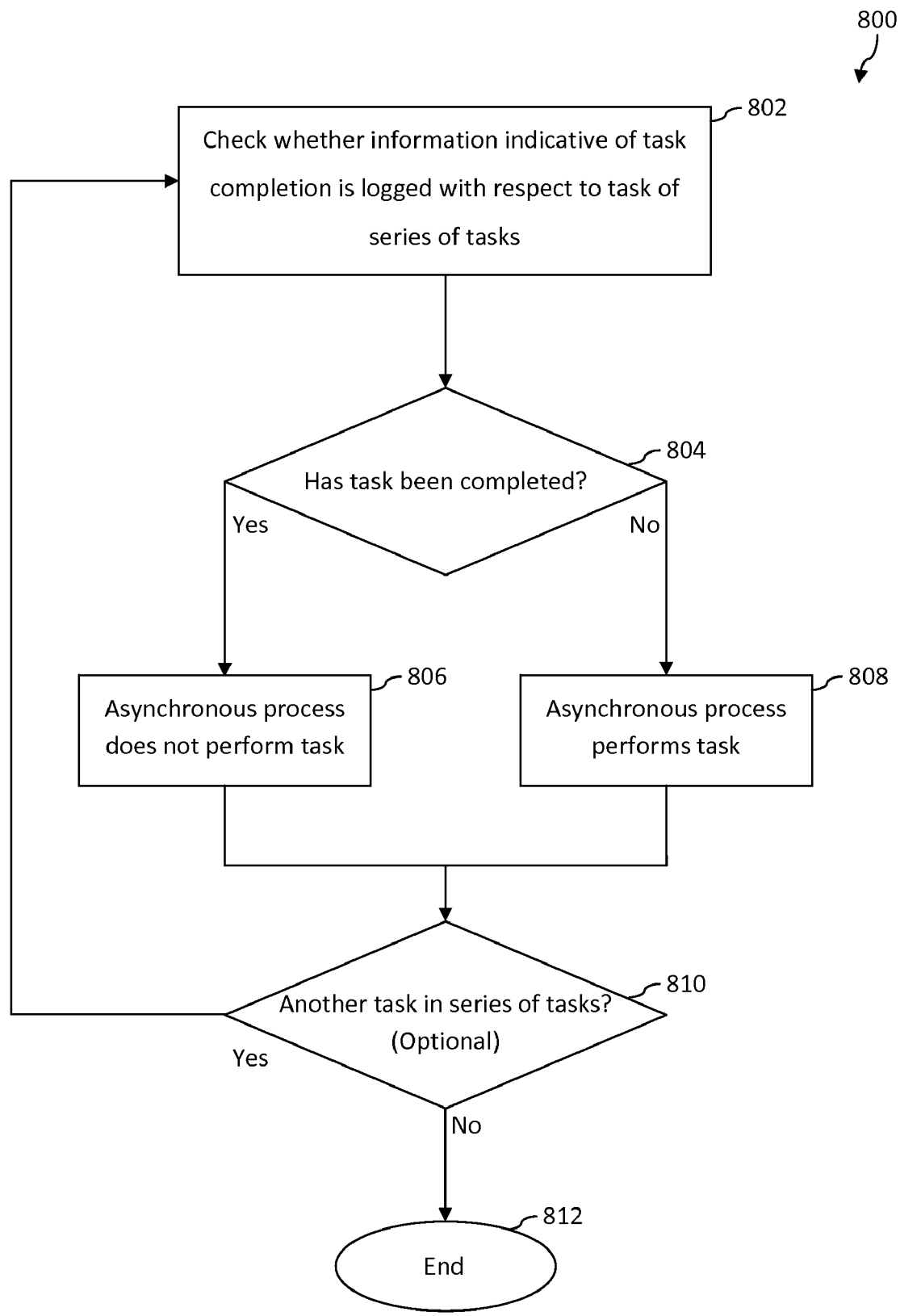

FIG. 8 depicts a flowchart 800 of another method for recovering an asynchronous process in accordance with an embodiment of the present invention.

Figure 9:
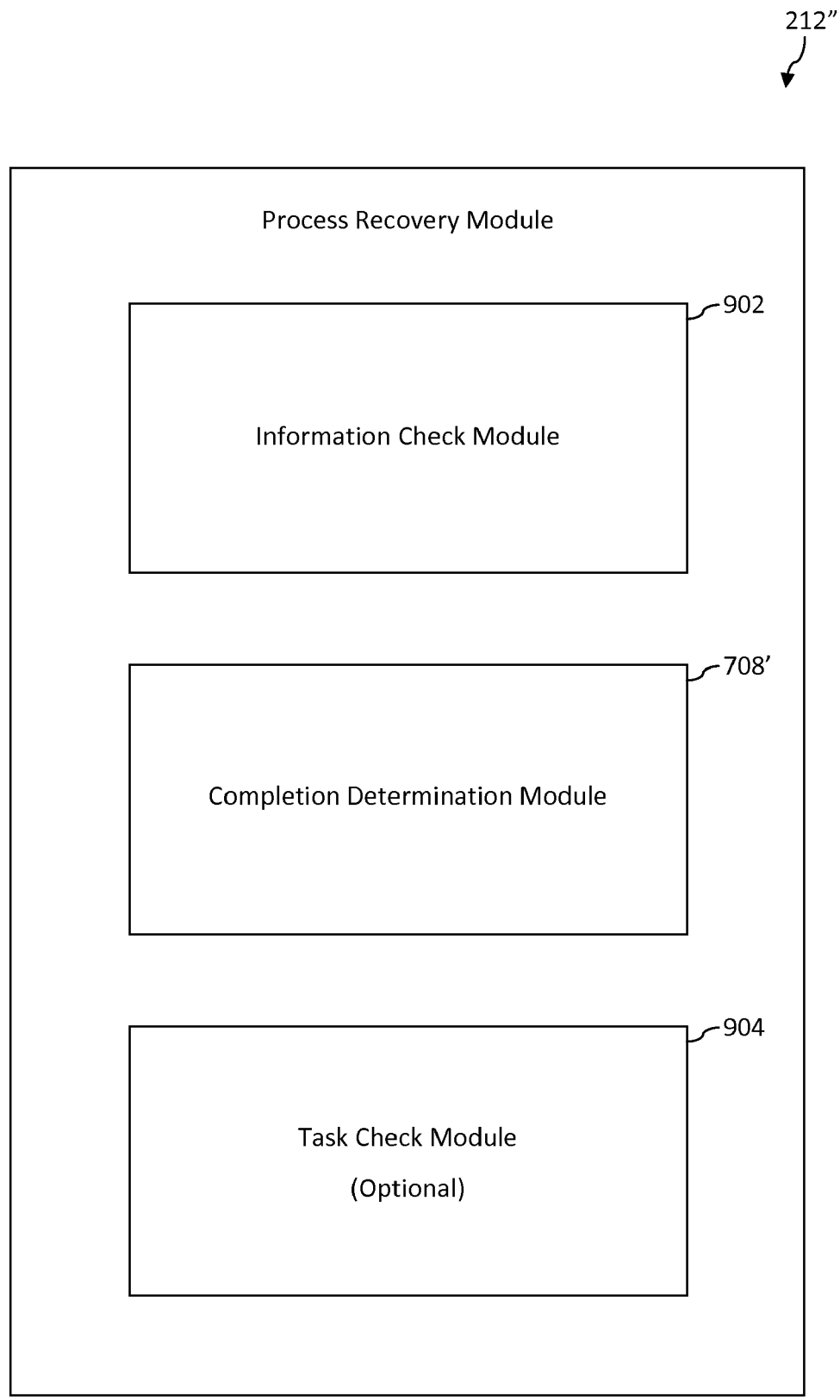
Figure 10:
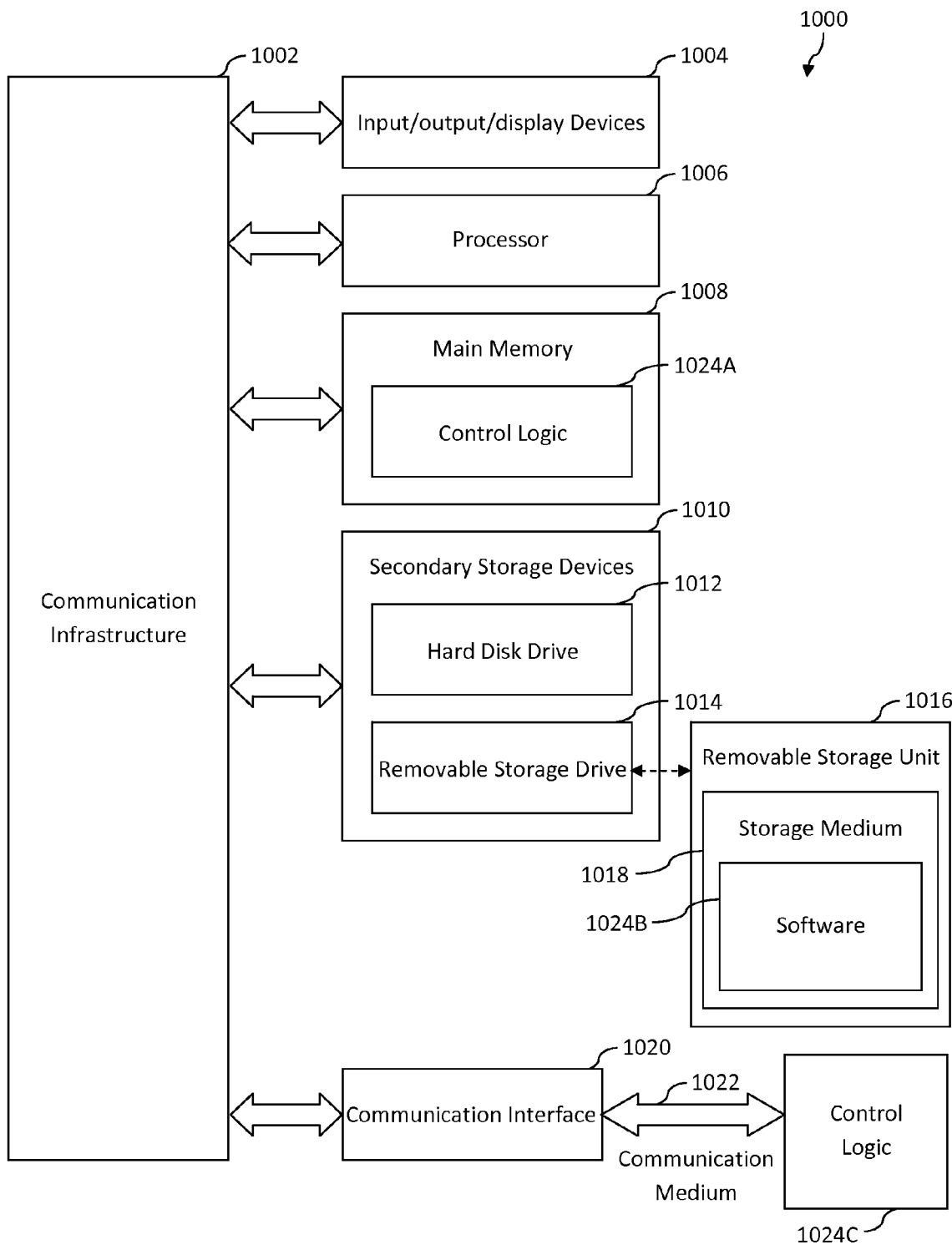
FIG. 10 is a block diagram of a computer system that may be used to implement one or more aspects of the present invention.

Flowchart 800 may be performed by a process recovery module 212 of creative asset processing system 106' shown in FIG. 2, for example. For illustrative purposes, flowchart 800 is described with respect to a process recovery module 212" shown in FIG. 9, which is an example implementation of a process recovery module 212, according to an embodiment of the present invention. As shown in FIG. 9, process recovery module 212" includes a completion determination module 708' and a task performance module 902. Further structural and operational embodiments will be apparent to persons skilled in the relevant art(s) based on the discussion regarding flowchart 800. Flowchart 800 is described as follows.

As shown in FIG. 8, the method of flowchart 800 begins at step 802 in which processing module 202 checks whether information indicative of task completion is logged with respect to a task of the series of tasks in accordance with instructions stored in information check module 902. For example, the information may be stored in scheduler module 214 (or another element of creative asset processing system 106) by processing module 202 with respect to a variable or field corresponding to the task in accordance with instructions stored in scheduler module 214 (or another element).

At step 804, processing module 202 makes a determination as to whether the task has been completed based on whether the information is logged in accordance with instructions stored in completion determination module 708'. If processing module 202 finds the information indicative of task completion, and therefore determines that the task has been completed, the asynchronous process does not perform the task at step 806. However, if processing module 202 does not find the information indicative of task completion, and therefore determines that the task has not been completed, the asynchronous process performs the task at step 808. The information indicative of task completion may be the output of the task (e.g., a URL, an encoding ID, etc.), a binary flag, or any other information suitable for indicating that the task has been completed.

At optional step 810, processing module 202 determines whether the series of tasks includes another task for which step 802 has not been performed in accordance with instructions stored in task check module 904. If processing module 202 determines that the series of tasks includes another task for which step 802 has not been performed, flow continues to step 802. Otherwise, the method ends at step 812.

According to an embodiment, process recovery module 212 may be configured to enable processing module 202 to perform all remaining tasks of the series of tasks upon determining that a task has not been completed. For instance, if processing module 202 determines that the first two tasks of a series of tasks have been performed, but the third task has not been performed, process recover module 212 may enable processing module to perform the fourth, fifth, etc. tasks without first checking whether those tasks have been completed.

The embodiments described herein have a variety of benefits as compared to conventional asynchronous processing techniques. For example, embodiments are capable of determining which task(s) of a series of tasks have been completed. The determination may be made based on whether information indicative of a task completion is logged with respect to the respective tasks. Embodiments are capable of not performing the completed task(s). For instance, an asynchronous process that is re-initiated upon detection of an error may be configured to perform only those tasks that were not completed before the error occurred. Accordingly, the process recovery techniques described herein may increase the efficiency of an asynchronous processing technique. Moreover, asynchronous processes that utilize the process recovery techniques described herein may consume less bandwidth and/or fewer resources of a system, as compared to conventional asynchronous processing techniques.

V. Example Computer System Implementation

The embodiments described herein, including systems, methods/processes, and/or apparatuses, may be implemented using well known servers/computers, such as computer 800 shown in FIG. 8. For example, elements of example online ad network 100, including creative asset processing system 106 depicted in FIGS. 1 and 2 and elements thereof, and each of the steps of activity diagrams 300, 400, and 500 and flowchart 600 depicted in respective FIGS. 3, 4, 5, and 6, can each be implemented using one or more computers 800.

Computer 800 can be any commercially available and well known computer capable of performing the functions described herein, such as computers available from International Business Machines, Apple, Sun, HP, Dell, Cray, etc. Computer 800 may be any type of computer, including a desktop computer, a server, etc.

As shown in FIG. 8, computer 800 includes one or more processors (e.g., central processing units (CPUs)), such as processor 806. Processor 806 may include processing module 202, for example, though the scope of the embodiments is not limited in this respect. Processor 806 is connected to a communication infrastructure 802, such as a communication bus. In some embodiments, processor 806 can simultaneously operate multiple computing threads.

Computer 800 also includes a primary or main memory 808, such as a random access memory (RAM). Main memory has stored therein control logic 824A (computer software), and data.

Computer 800 also includes one or more secondary storage devices 810. Secondary storage devices 810 include, for example, a hard disk drive 812 and/or a removable storage device or drive 814, as well as other types of storage devices, such as memory cards and memory sticks. For instance, computer 800 may include an industry standard interface, such as a universal serial bus (USB) interface for interfacing with devices such as a memory stick. Removable storage drive 814 represents a floppy disk drive, a magnetic tape drive, a compact disk drive, an optical storage device, tape backup, etc.

Removable storage drive 814 interacts with a removable storage unit 816. Removable storage unit 816 includes a computer useable or readable storage medium 818 having stored therein computer software 824B (control logic) and/or data. Removable storage unit 816 represents a floppy disk, magnetic tape, compact disc (CD), digital versatile disc (DVD), Blue-ray disc, optical storage disk, memory stick, memory card, or any other computer data storage device. Removable storage drive 814 reads from and/or writes to removable storage unit 816 in a well known manner.

It will be apparent to persons skilled in the relevant art(s) that storage 204 of FIG. 2 or a portion thereof (e.g., any one or more of send queue module 206, poll queue module 208, receive queue module 210, scheduler module 214, creative asset service module 216, creative asset process module 218, creative asset database 220, temporary storage 222, or process database 224) may be included in main memory 808, secondary memory 810, removable storage unit 816, or some combination thereof, though the scope of the embodiments is not limited in this respect.

Computer 800 also includes input/output/display devices 804, such as monitors, keyboards, pointing devices, etc.

Computer 800 further includes a communication or network interface 820. Communication interface 820 enables computer 800 to communicate with remote devices. For example, communication interface 820 allows computer 800 to communicate over communication networks or mediums 822 (representing a form of a computer useable or readable medium), such as local area networks (LANs), wide area networks (WANs), the Internet, etc. Network interface 820 may interface with remote sites or networks via wired or wireless connections. Examples of communication interface 822 include but are not limited to a modem, a network interface card (e.g., an Ethernet card), a communication port, a Personal Computer Memory Card International Association (PCMCIA) card, etc.

Control logic 824C may be transmitted to and from computer 800 via the communication medium 822.

Any apparatus or manufacture comprising a computer useable or readable medium having control logic (software) stored therein is referred to herein as a computer program product or program storage device. This includes, but is not limited to, computer 800, main memory 808, secondary storage devices 810, and removable storage unit 816. Such computer program products, having control logic stored therein that, when executed by one or more data processing devices, cause such data processing devices to operate as described herein, represent embodiments of the invention.

For example, each of the elements of example online ad network 100, including creative asset processing module 106 depicted in FIGS. 1 and 2 and its sub-elements, including send queue module 206, poll queue module 208, and receive queue module 210, each depicted in FIG. 2; scheduler module 214 depicted in FIGS. 2, 3, and 4; creative asset service module 216 depicted in FIGS. 2, 3, 4, and 5; creative asset process module 218 depicted in FIGS. 2, 3, and 4; creative asset database 220 depicted in FIGS. 2, 3, and 5; temporary storage 222 and process database 224, each depicted in FIGS. 2 and 5; and each of the steps of activity diagrams 300, 400, and 500 and flowchart 600 depicted in respective FIGS. 3, 4, 5, and 6 can be implemented as control logic that may be stored on a computer useable medium or computer readable medium, which can be executed by one or more processors to operate as described herein.

The invention can be put into practice using software, hardware, and/or operating system implementations other than those described herein. Any software, hardware, and operating system implementations suitable for performing the functions described herein can be used.

VI. Conclusion

While various embodiments of the present invention have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method implemented by an asynchronous process configured to perform a series of tasks, comprising:
    logging information in response to completing one or more tasks of the series of tasks to indicate that the respective one or more tasks are complete;
    detecting an error with respect to execution of the asynchronous process; and
    requesting that a scheduler re-initiate the asynchronous process;
    wherein the logging, detecting, and requesting are performed by the asynchronous process executing in a processing system, and
    wherein the re-initiated asynchronous process does not perform the one or more completed tasks responsive to reading the logged information.

2. The method of claim 1, wherein the asynchronous process is a send queue job being performed with respect to a creative asset uploaded in an online advertisement network.

3. The method of claim 1, wherein the asynchronous process is a receive queue job being performed with respect to a plurality of encoded files corresponding to a creative asset uploaded in an online advertisement network.

4. The method of claim 1, further comprising:
    generating a plurality of encoded files based on an uploaded video file;
    wherein the asynchronous process has a plurality of sub-processes that include respective tasks of the series of tasks, and
    wherein each sub-process corresponds to a respective encoded file of the plurality of encoded files.

5. The method of claim 1, wherein detecting the error comprises:
    detecting a timeout indicator with respect to the asynchronous process.

6. The method of claim 1, wherein detecting the error comprises:
    detecting an error indicator received from a database for storing a video file that is a subject of the asynchronous process.

7. A method of performing a series of tasks of an asynchronous process, comprising:
    determining, by the asynchronous process executing in a processing system, whether one or more tasks of the series of tasks have been completed based on whether a scheduler has logged information indicative of a task completion with respect to the respective tasks;
    responsive to determining that a task of the one or more tasks has been completed, not performing that task by the asynchronous process; and
    responsive to determining that a task of the one or more tasks has not been completed, performing that task by the asynchronous process.

8. The method of claim 7, wherein determining whether the one or more tasks of the series of tasks have been completed comprises:
    determining, by the asynchronous process executing in the processing system, whether each task of the series of tasks has been completed based on whether the scheduler has logged information indicative of a task completion with respect to the respective tasks.

9. The method of claim 7, further comprising:
    responsive to determining that a task of the one or more tasks has not been completed, performing remaining tasks of the series of tasks by the asynchronous process without first determining whether the remaining tasks have been completed.

10. The method of claim 7, wherein the asynchronous process is a send queue job being performed with respect to a creative asset uploaded in an online advertisement network.

11. The method of claim 7, wherein the asynchronous process is a receive queue job being performed with respect to a plurality of encoded files corresponding to a creative asset uploaded in an online advertisement network.

12. A computer program product comprising a computer-readable medium having computer program logic recorded thereon for enabling a processor-based system to perform a series of tasks of an asynchronous process, comprising:
    a first program logic module for enabling the processor-based system to perform a first operation by which the asynchronous process logs information in response to completing one or more tasks of the series of tasks to indicate that the respective one or more tasks are complete;
    a second program logic module for enabling the processor-based system to perform a second operation by which the asynchronous process detects an error with respect to execution of the asynchronous process;
    a third program logic module for enabling the processor-based system to perform a third operation by which the asynchronous process requests that a scheduler re-initiate the asynchronous process; and
    a fourth program logic module for enabling the processor-based system to perform a fourth operation by which the re-initiated asynchronous process does not perform the one or more completed tasks responsive to reading the logged information.

13. The computer program product of claim 12, further comprising:
    a fifth program logic module for enabling the processor-based system to perform a fifth operation by which the asynchronous process generates a plurality of encoded files based on an uploaded video file;
    wherein the asynchronous process has a plurality of sub-processes that include respective tasks of the series of tasks, and
    wherein each sub-process corresponds to a respective encoded file of the plurality of encoded files.

14. The computer program product of claim 12, wherein the second program logic module includes instructions for enabling the processor-based system to detect a timeout indicator with respect to the asynchronous process.

15. A system to perform a series of tasks of an asynchronous process, comprising:
    an information log module configured to enable the asynchronous process to log information in response to one or more tasks of the series of tasks being completed, wherein the logged information indicates that the respective one or more tasks are complete;

an error detection module configured to enable the asynchronous process to detect an error with respect to execution of the asynchronous process;

a re-initiation request module configured to request that a scheduler re-initiate the asynchronous process; and a completion determination module configured to enable the re-initiated asynchronous process to not perform the one or more completed tasks responsive to reading the logged information.

16. The system of claim 15, wherein the asynchronous process is a send queue job being performed with respect to a creative asset uploaded in an online advertisement network.

17. The system of claim 15, wherein the asynchronous process is a receive queue job being performed with respect to a plurality of encoded files corresponding to a creative asset uploaded in an online advertisement network.

18. The system of claim 15, further comprising:

a creative asset process module configured to generate a plurality of encoded files based on an uploaded video file;

wherein the asynchronous process has a plurality of sub-processes that include respective tasks of the series of tasks, and wherein each sub-process corresponds to a respective encoded file of the plurality of encoded files.

19. The system of claim 15, wherein the error detection module is configured to enable the asynchronous process to detect a timeout indicator with respect to the asynchronous process.

20. The system of claim 15, wherein the error detection module is configured to enable the asynchronous process to detect an error indicator received from a database for storing a video file that is a subject of the asynchronous process.

* * * * *